No. 612,925. Patented Oct. 25, 1898.
G. C. HANGER.
FEED CUTTER.
(Application filed July 2, 1897.)
(No Model.)
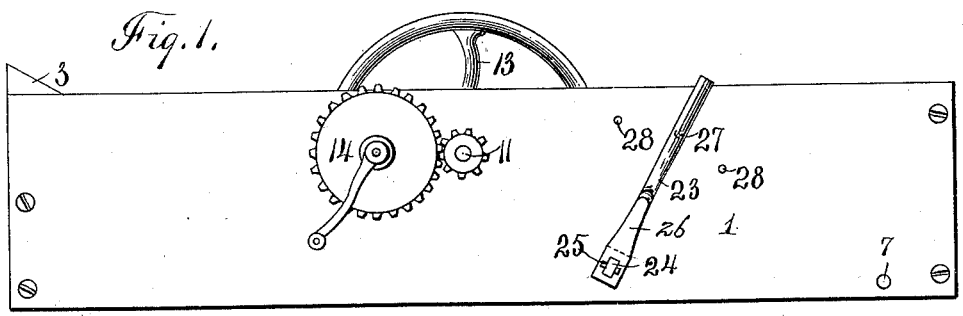
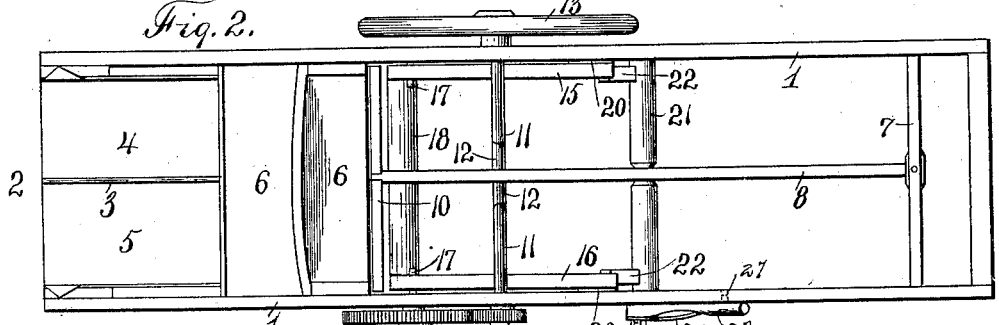
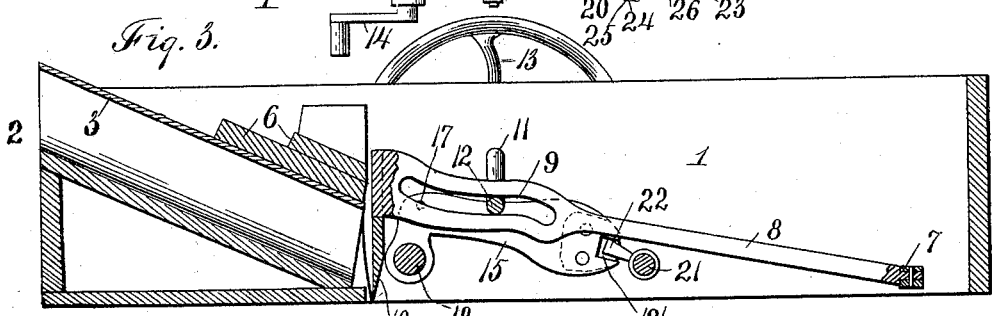
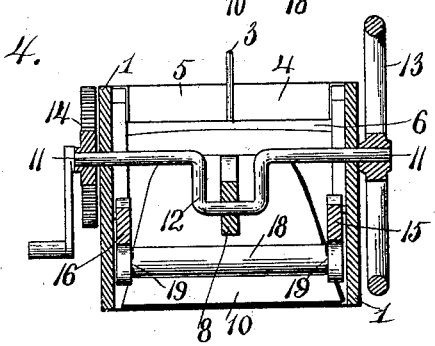 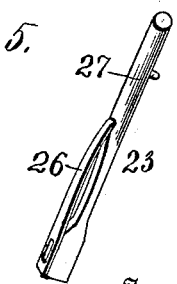
Witnesses
W. E. Allen
Victor J. Evans
Inventor
George C. Hanger.
by John Wedderburn
Attorney

United States Patent Office.

GEORGE C. HANGER, OF CHURCHVILLE, VIRGINIA.

FEED-CUTTER.

SPECIFICATION forming part of Letters Patent No. 612,925, dated October 25, 1898.

Application filed July 2, 1897. Serial No. 643,292. (No model.)

*To all whom it may concern:*

Be it known that I, GEORGE C. HANGER, of Churchville, in the county of Augusta and State of Virginia, have invented certain new and useful Improvements in Feed-Cutters; and I do hereby declare the following to be a full, clear, and exact description of the invention, such as will enable others skilled in the art to which it appertains to make and use the same.

My invention relates to feed-cutters, and more particularly to a machine for cutting corn.

My object is to provide a machine of the class described which will be provided with improved mechanism for gaging the size of the pieces cut, novel means for holding the ears of corn in proper position so that a clean cut can be made, and a knife operated in any improved manner whereby ample time is given for the corn to feed before the cut is made.

Having the foregoing object in view, the invention consists of certain improved devices adapted to coact in a novel manner, as will appear more fully hereinafter.

In the accompanying drawings, Figure 1 is a side elevation. Fig. 2 is a plan view. Fig. 3 is a longitudinal section, and Fig. 4 is a cross-section.

The body of the machine is shown at 1, the same being supported in a preferred manner. At one end of the body there is an incline 2, which has a central partition 3, defining two chutes 4 and 5, down which the corn is adapted to pass.

The numeral 6 designates a retaining-plate which extends over the chute, near the lower end thereof, and serves to hold the ears of corn down in said chute and to prevent any tipping or tilting of the ears when the cut is made.

The numeral 7 designates a shaft journaled in the frame, and 8 is a knife-arm which is secured to said shaft and adapted to vibrate in a vertical plane. This knife-arm has a compound-curved slot 9.

The numeral 10 designates a knife secured to the free end of the arm aforesaid and of slightly greater width than the combined widths of the chutes, the same being adapted to operate across the ends of said chutes.

Said knife strikes the ears transversely thereof and cuts them, the pieces dropping down through the frame. At 11 there is shown a crank-shaft having a crank-loop 12, which is loosely received in the compound-curved slot of the knife-arm, and by the rotation of said shaft the knife-arm, and hence the knife, is operated. A fly-wheel 13 is preferably provided for the crank-shaft. Crank-operated gear-and-pinion mechanism 14 is employed for turning the shaft.

I desire to call especial attention to the coaction between the combined curved slot and the crank-loop. It will be observed that owing to the employment of a slot of this shape the knife is permitted to remain substantially stationary in raised position during a portion of the movement of the crank-loop, and consequently the ears of corn are given ample time to feed downwardly after a cut has been made and the knife raised. I employ two bell-crank levers 15 and 16, which are duplicates, the same being pivoted at their angles to the interior faces of the sides of the frame, as at 17. The short arms of the levers depend and the long arms extend rearwardly.

The numeral 18 designates a gage-roller, having reduced ends 19, journaled in the short arms of the bell-crank levers. The ends of the ears of corn rest against this roller, and the position of the latter determines the length of the pieces cut from said ears. By reason of the employment of a gage-roller there is no tendency for the ends of the ears to catch after being cut, and hence no danger of the machine being clogged at this point. The free ends of the long arms of the bell-crank levers are bifurcated at 19', and plates 20 are secured to said arms for a purpose which will now appear.

The numeral 21 designates a rock-shaft in the sides of the frame and provided with fingers 22, which are received in the bifurcated portions of the levers and rest against the plates secured to the latter, said plates preventing transverse thrust of the fingers and the levers.

The numeral 23 designates a controlling-lever, the same being located on the square end 24 of the rock-shaft and held in position by a linchpin 25.

The numeral 26 designates a spring secured to the rock-shaft and to the lever and adapted to urge said lever in toward the frame. A locking-pin 27, secured to said lever, is adapted for reception in any one of a series of openings 28 in the frame, said openings determining the distance at which the gage-roller lies from the ends of the chutes.

It will be apparent that when the lever is rocked the fingers of the rock-shaft will wipe against the ends of the bell-crank levers and, said levers being shifted, the gage-roller will be advanced toward or retreated from the lower ends of the chute.

Briefly described, the operation is as follows: The ears of corn are placed in the chutes, and they then gravitate until they strike the gage-roller. The crank-shaft having been put in rotation, the knife is made to descend and cuts off the ends of the ears, the latter dropping to the ground. The knife then rises, when, owing to the employment of the crank-loop and the compound-curved slot, it is poised a sufficient length of time to allow the ears to again gravitate until they strike the gage-roller. The knife then descends and the operation is repeated. The retaining-plate serves to prevent tilting of the ears when struck by the knife.

Other means could be employed for adjusting the gage-roller, and, in fact, many slight changes could be resorted to in different parts of the device.

Having thus described my invention, what I claim as new, and desire to secure by Letters Patent, is—

1. In a device of the class described, the combination of a cutting-knife, a chute for feeding the corn, pivoted bell-crank levers, a gage carried by one end of said levers, a rock-shaft operatively connected with the other end of the levers, and means for securing said rock-shaft in predetermined positions, substantially as described.

2. In a device of the class described, the combination with a cutting-knife, of means for feeding the corn thereto, pivoted bell-crank levers, a gage secured to one set of arms of said levers, the other arms of the levers being bifurcated, a rock-shaft having fingers received in the bifurcated portions, a controlling-lever secured to the rock-shaft, and means for locking said lever in predetermined positions, substantially as described.

3. In a machine of the class described, the combination with a cutting-knife, of means for feeding the corn thereto, a movable gage, a rock-shaft, operative connections between the rock-shaft and the gage, a controlling-lever secured to the rock-shaft and movable relatively thereto, a spring bearing against said lever, a locking-pin secured to the lever, and a machine-frame for said parts having openings to receive said locking-pin, substantially as described.

In testimony whereof I have signed this specification in the presence of two subscribing witnesses.

GEORGE C. HANGER.

Witnesses:
 B. F. TERRY,
 JOS. B. WOODWARD.